United States Patent [19]

Brandenstein et al.

[11] Patent Number: 5,470,279
[45] Date of Patent: Nov. 28, 1995

[54] PRESETTABLE BELT TENSION DEVICE

[75] Inventors: Manfred Brandenstein, Eussenheim; Wolfgang Friedrich, Schweinfurt; Roland Haas, Hofheim; Gerhard Herrmann; Armin Olschewski, both of Schweinfurt, all of Germany

[73] Assignee: SKF GmbH, Schweinfurt, Germany

[21] Appl. No.: 149,131

[22] Filed: Nov. 8, 1993

Related U.S. Application Data

[63] Continuation of Ser. No. 698,400, May 10, 1991, abandoned.

[30] Foreign Application Priority Data

May 10, 1990 [DE] Germany .......................... 40 15 028.3

[51] Int. Cl.⁶ ..................................................... F16H 7/08
[52] U.S. Cl. ............................................................. 474/135
[58] Field of Search ........................... 474/101, 109–111, 474/113–117, 133–138

[56] References Cited

U.S. PATENT DOCUMENTS

| | | | |
|---|---|---|---|
| 4,472,162 | 9/1984 | Hitchcock | 474/135 |
| 4,696,663 | 9/1987 | Thomey et al. | 474/135 X |
| 4,906,222 | 3/1990 | Henderson | 474/135 |
| 5,011,460 | 4/1991 | Ouchi et al. | 474/135 X |

FOREIGN PATENT DOCUMENTS 2524744  12/1976  Germany .

*Primary Examiner*—Michael Powell Buiz
*Attorney, Agent, or Firm*—Rosen, Dainow & Jacobs

[57] ABSTRACT

A tensioning device is provided with an adjusting element that is adapted to be affixed to the tensioning device after the tension spring therein has been tensioned. The tension can be adjusted to a desired work point after the tensioning element has been mounted on a motor frame or the like.

8 Claims, 2 Drawing Sheets

PRESETTABLE BELT TENSION DEVICE

This application is a continuation of application Ser. No. 07/698,400, filed May 10, 1991, now abandoned.

FIELD OF THE INVENTION

This invention relates to a presettable tension device.

BACKGROUND OF THE INVENTION

One tension device of the type with which the present invention is concerned is disclosed in U.S. Pat. No. 4,472,162 entitled BELT TENSIONER whose Abstract states "A tensioning device is provided with an adjusting element that is adapted to be affixed to the tensioning device after the tension spring therein has been tensioned." In this device the tension spring has a stationary part in a recess of a multi-part support. In addition, a pot shaped sheet metal body has a projection engaging a support plate to prevent turning thereof. As a result the tension of the spring and the working point is fixed and cannot be adjusted. Since the spring that is used is subject to large variations in its spring force due to its preparation or as a result of defects in the material, great variations in the characteristics of the devices can be expected in mass production.

For this reason, as proposed in German Patent Application P 39 08 817.0, the tension device, after its preparation, is pretensioned to the value of the later desired workpoint, and at this position is positioned with respect to marks or the like which permit reproducing the position with a defined tension force. The known device are not suitable, however, if the tension device is to be provided with an arrangement for limiting the turning region or is to be provided with other features which proscribe one orientation, without additional arrangements.

SUMMARY OF THE INVENTION

It is thereby an object of the invention to provide a tension device of the above described type, which in fixed assumed assembled positions exhibit only tension forces that have minimum deviations from one another.

This object is solved in accordance with the invention by providing an arrangement wherein the adjusting element can be adjusted after the tensioning of the spring in the individual devices to a predetermined position determined in a measuring procedure. The adjusting element has a bore, recess, etc. for receiving the respective end of the spring and can be initially freely adjusted. Depending upon the requirements of the specific application, the adjusting element can be affixed to a rotatable support, so that one end of the spring engages the support and the other end thereof engages an assembly device or an adjustment element affixed to the assembly device. A tension is produced in the spring upon rotation of the adjusting element in both cases. This step is preferably performed as the last work step in the apparatus, after the assembly of the tension device, and may be accompanied with the measurement of the reaction moment of the tensioned spring. When the desired moment is obtained the adjusting element is connected to the respective support or assembly element in a manner that prevents relative rotation with respect thereto. When the simulated position of the device is realized on the motor block, it advantageously automatically adjusts itself again to the set up value.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
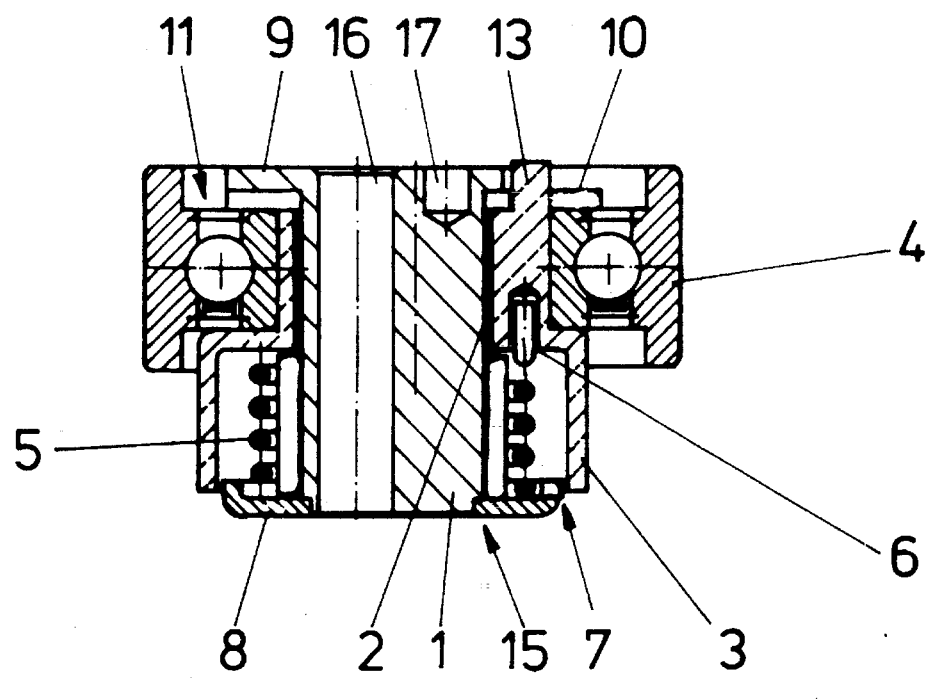
FIG. 1 is a partial longitudinal section of a tension device in accordance with the invention with an adjustably mounted holding element.
Figure 2:
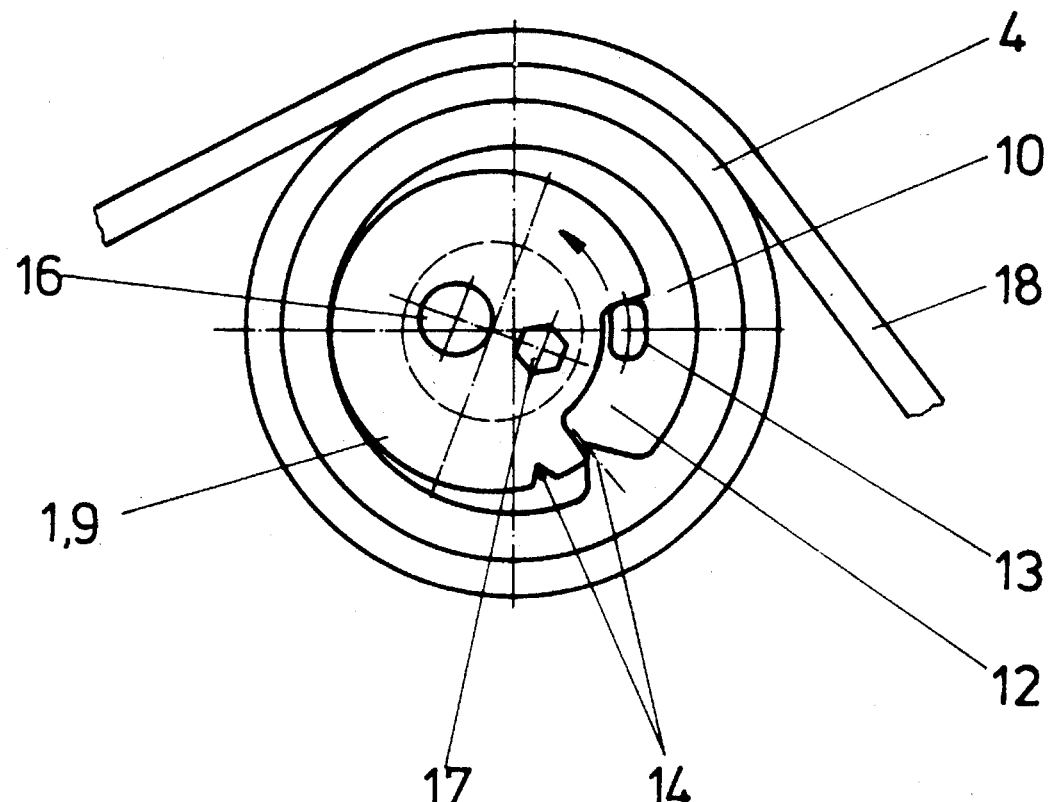
FIG. 2 is a plan view of the tension device of FIG. 1.

The tension device illustrated in FIGS. 1 and 2 is comprised of a mounting element 1, a support 3 pivotably mounted on the mounting element 1 via a guide bush 2, and a rotatable tension roller 4 mounted on the support 3. A helical spring 5 is located in an annular space between the support 3 and the mounting element 1, and one end 6 of the spring extends into a pocket drilled into the support 3. The other end 7 of the spring engages an adjustment element 8 which is held against rotation and axial movement in the illustrated position with respect to the mounting element 1 (for example by a force fit on the mounting element). The mounting element 1 has a flange 9 separated from one end 11 of the bearing by an intermediate plastic disk 10 partially engaging the end 11 of the bearing. In addition, a circumferentially limited recess 12 (FIG. 2) is provided on the flange 9, which, together with an axial projection 13 of the support 3, limits the pivotal movement of the support with respect to the mounting element. The projection 13 extends through an aperture in the plastic disc 10, so that the disc is held circumferentially with respect to the support 3. The plastic disk 10, as illustrated in FIG. 2, is provided with a notch 14, which, together with a further notch 14F in the flange 9, marks the central workpoint of the pivotal movement, provided it can be brought to deviate from the illustrated position by pivoting of the adjustment element. The position of FIG. 2 shows the rest position of the tension arrangement with an already tensioned helical spring 5, wherein the projection 13 engages the circumferential end of the recess 12.

The adjustment of the tension arrangement will now be described.

After the device is assembled without the adjustment element thereon, as a last step the spring force is adjusted and the adjustment element 8 is affixed to the mounting element. For this purpose the tension device is pivoted in a simple jig (not illustrated) that permits the adjustment of the relative angular displacement of the mounting element and the support 3, until the two notches 14, 14A coincide. This alignment adjusts the device to the center of the adjustment range and the later desired work point. In this position the helical spring 5 is tensioned by rotating the adjustment element 8 that engages the second end of the helical spring. The reaction moment of the helical spring 5 is thereby overcome, using a known tensioning arrangement. Upon reaching the desired value, the adjustment element 8 is pressed onto a knurled shoulder 15 of the mounting element 1. Additionally the seat of the shoulder is peened over, whereby a high insurance against turning and axial movement of the adjustment element is obtained. Since each tension device can be adjusted to have the same spring force at the center of the pivot movement, a practical constant tension is provided for all tension devices in a series of devices.

This concludes the preparation of the device. In the assembly of the device on a motor block, the tension device is next loosely screwed on the motor block by a bolt (not shown) that extends through an eccentric bore. A work tool is inserted in the hexagonal socket 17 of the mounting element to turn the tension device against the drive belt 18 illustrated in FIG. 2. When the belt stretches, a reaction force acts on the tension device. Upon further pivoting, the helical spring 5 is tensioned and the mounting element 1 pivots in the direction of the arrow and assumes the operating position with the projection 13 as illustrated in FIG. 2. The pivoting process is continued until the two notches 14 coincide. At this position (not illustrated), the projection 13 is in the center of the recess 12 respectively of the pivot region and is adjusted accurately to the preadjustment position. The bolt is screwed tight at this position.

Figure 3:
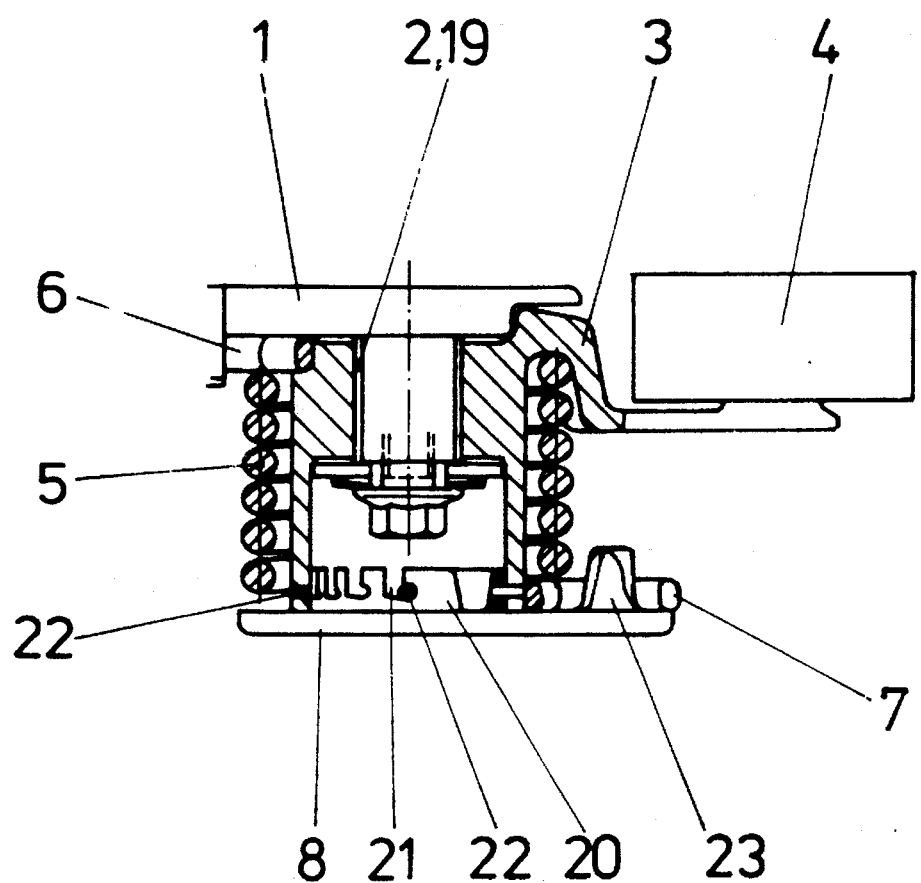
FIG. 3 is a partial longitudinal section of a tension device with a bayonet latching arrangement.

The tension arrangement illustrated in FIG. 3A is provided with a lever shaped support 3. The tension roller 4A is mounted on one end thereof and the pivot bearing 19 is mounted on the other end. The helical spring 5A having ends 6A, 7A acts between a mounting plate 1A and the adjustment element 8A, which is affixed to the support 3A with a bayonet latching device 21, 22. The latching device consists of a plurality of bayonet recesses 21 distributed about the circumference of the adjusting element, the recesses being formed in a seating ring 20, and, for example, four pins 22 distributed about the circumference and extending radially from the support 3A. After the assembly of the tension device, the adjusting element 8A is turned with respect to the support 3A, and the respective end 7A of the helical spring 5A is latched by the bayonet latching device. The adjustment can step the bayonet parts as above discussed. Also in this case an adjustment can be obtained using markings and limited pivot regions, as described in the previous example of the invention, although such markings and pivot regions are not shown in the embodiment of the invention of FIG. 3.

While the invention has been disclosed and described with reference to a limited number of embodiments, it will be apparent that variations and modification may be made therein, and it is therefore intended in the following claims to cover each such variation and modification as falls within the true spirit and scope of the invention.

What is claimed is:

1. A belt tensioning device which is preadjustable after assembly in an auxiliary device, the device including a mounting element for attachment to an auxiliary device, a supporting member pivotally mounted on said mounting element, a tension roller rotatably carried by said supporting member, and a spring having a first end engaging and secured to and urging said supporting member to pivot relative to said mounting element, the improvement of adjustment indicators on said supporting member and said mounting element respectively, means for pivoting said mounting element relative to the supporting element until said indicators coincide, an adjustment element for engaging said second end of the spring and tensioning said spring relative to said supporting element until a predetermined tension exists therebetween while said indicators coincide, and means for fixing said adjustment element to said mounting element, whereby subsequent pivoting of said adjusting element until said indicators coincide will automatically apply said predetermined tension to said spring.

2. A belt tensioning device according to claim 1 mountable with an axial fastening means, wherein said mounting element has an eccentrically located bore therethrough, said mounting element is adapted to receive all axial fastening means through said bore, whereby said mounting element is eccentrically rotatable about said fastening means.

3. A belt tensioning device according to claim 1 further comprising a plurality of spaced apart locking means for locking said adjustment element to said mounting element selectively at a plurality of positions corresponding to a plurality of tensions of said spring.

4. A belt tensioning device according to claim 3 wherein said plurality of locking means comprises pins and recesses with pins on one of said adjustment element and mounting element and recesses on the other.

5. A belt tensioning device according to claim 3 wherein said plurality of locking means comprise latch means permitting said adjustment element to pivot relative to said mounting element through a succession of positions, each causing greater tension in said spring.

6. A belt tensioning device according to claim 3 wherein said spring is a helical coil spring.

7. A belt tensioning device mountable to an auxiliary apparatus, the device having a mounting element, a supporting member rotatable thereon, a tension roller rotatably carried by said supporting member, a spring mounted between said mounting element and said supporting member, the improvement comprising means for rotating the supporting member relative to the mounting element to a predetermined relative position and marking said relative position, means for tensioning said spring to a predetermined stress level while said supporting member is rotated to said marked position, means for fixing said spring relative to said supporting member while the spring is at said predetermined stress level, means for releasing said stress on said spring, means for mounting said device to an auxiliary apparatus, means for rotating said support member relative to said mounting element while said support means and tensioning roller engage said auxiliary apparatus until said marking is again at said predetermined position, and means for fixing said mounting means to said auxiliary apparatus, whereby said spring in said belt tensioning device is adjusted to said predetermined stress level.

8. A method for assembly of a preadjustable belt tensioning device which has a mounting element, a supporting member capable of pivoting thereon by way of a spring and a tension roller fastened thereon, where one end of the spring is arranged in an adjusting element rotatable with respect to the other end, characterized by the following steps:

placing adjustment indicators on said mounting element and on said supporting element, rotating said elements until said indicators coincide, applying force to said spring until a predetermined tension exists, fixing said adjustment element to said mounting element while said spring is at said predetermined tension, and releasing said force on said spring, said device when attached to an auxiliary device is rotatable until said indicators coincide, whereby said spring will be in said predetermined tension.

* * * * *